March 24, 1942. A. K. ROHRBACH ET AL 2,277,456
AIRCRAFT WING CONSTRUCTION
Filed July 7, 1938 5 Sheets-Sheet 1
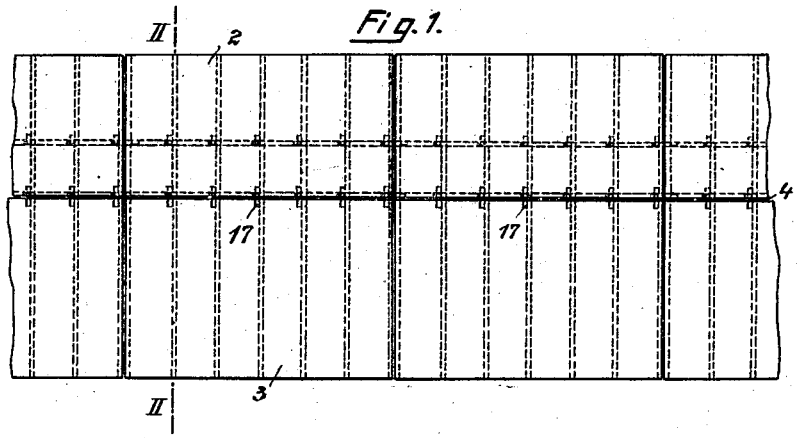
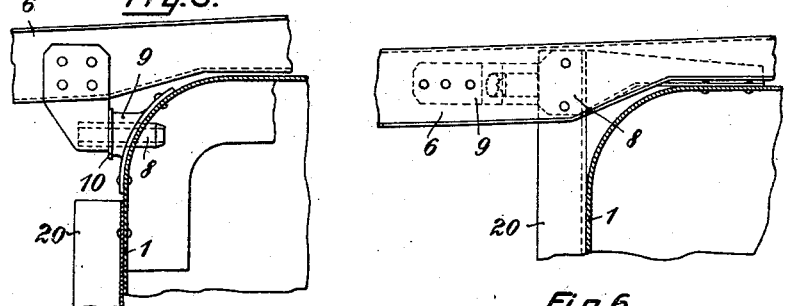
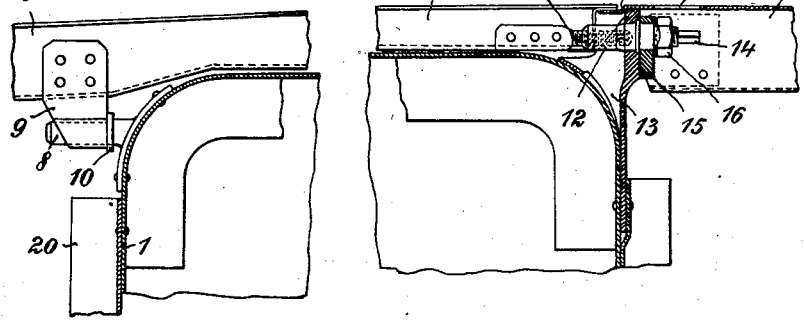
Inventors
A. K. ROHRBACH
A. DOAN

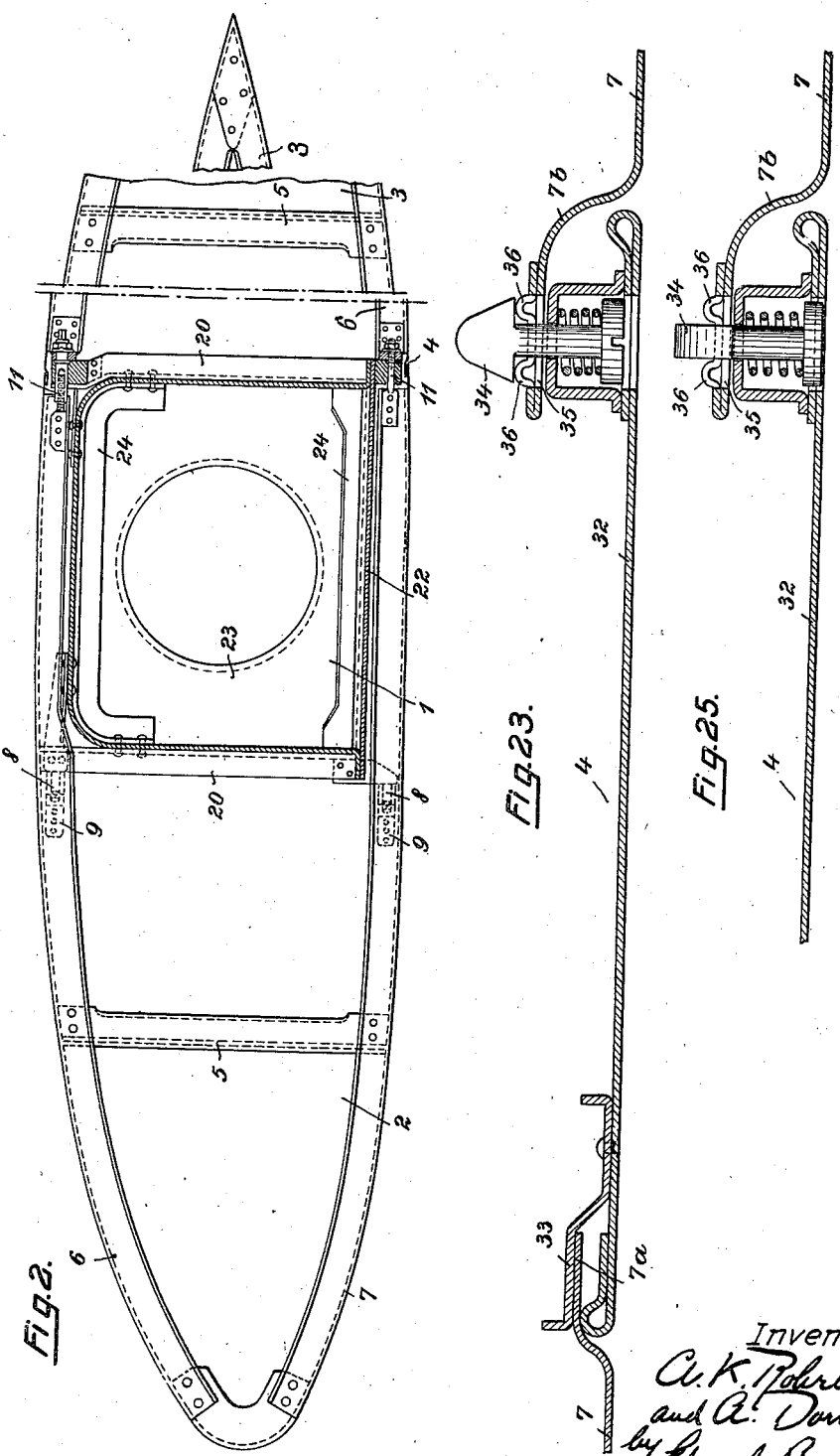

March 24, 1942.  A. K. ROHRBACH ET AL  2,277,456
AIRCRAFT WING CONSTRUCTION
Filed July 7, 1938   5 Sheets-Sheet 3

Inventors
A. K. Rohrbach
A. Dorn
By Blair & Kilcoyne
Attys.

Inventors
A. K. Rohrbach.
A. Dorn.

March 24, 1942.  A. K. ROHRBACH ET AL  2,277,456
AIRCRAFT WING CONSTRUCTION
Filed July 7, 1938   5 Sheets-Sheet 5

Inventor:
A. K. Rohrbach
and A. Dorn
By Edwards, Bower & Poole

Patented Mar. 24, 1942

2,277,456

UNITED STATES PATENT OFFICE 2,277,456

AIRCRAFT WING CONSTRUCTION

Adolf Karl Rohrbach, Bremen-Oberneuland, and Alfred Dorn, Lemwerder, near Bremen, Germany; G. Edzard administrator of said Adolf Karl Rohrbach, deceased, assignors to "Weser" Flugzeugbau G. m. b. H., Bremen, Germany, a limited liability company of Germany Application July 7, 1938, Serial No. 218,010
In Germany July 7, 1937

10 Claims. (Cl. 244—123)

Aircraft wings are commonly constructed of a framework of spars running lengthwise of the wing and transverse ribs to which are secured an envelope or skin, usually applied in sections, forming the wing surfaces.

This invention relates to aircraft wings of built-up construction and objects of the invention are to provide a construction involving as few major elements as possible; to provide a construction permitting rapid dismantling for overhaul, repairs, etc., and in particular to provide for easy attachment and removal of the wing ribs; to provide front and rear wing parts which are easily and independently removable from the wing without disturbing the remainder of the wing; to provide a minimum number of longitudinal joints in a construction in which separate front and rear wing parts are secured to a spar; to provide such a spar which is sufficiently strong to resist the bending and twisting forces applied to it in service, and is at the same time light and cheap and simple to manufacture; and generally to provide a built-up construction of parts which are easily assembled and can be easily dismantled and which are of simple design and economical to manufacture.

The foregoing and other objects of the invention are achieved by a form of wing construction more fully explained hereinafter in conjunction with the accompanying drawings which illustrate some preferred ways of carrying the invention into practice.

In the drawings:

Fig. 1 is a plan view of part of a wing constructed in accordance with the invention, Fig. 2 is an enlarged section on the line II—II of Fig. 1, showing how the wing is built-up from front and rear wing parts secured to a supporting spar, Figs. 3–13 illustrate how the front and rear wing ribs may preferably be connected to the spar and to one another.

Figure 20:
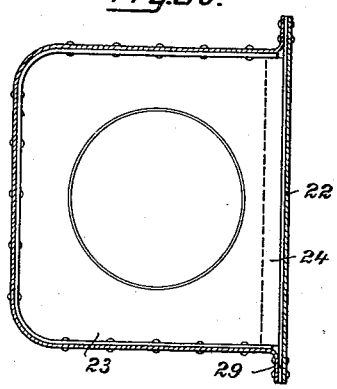
Figure 21:
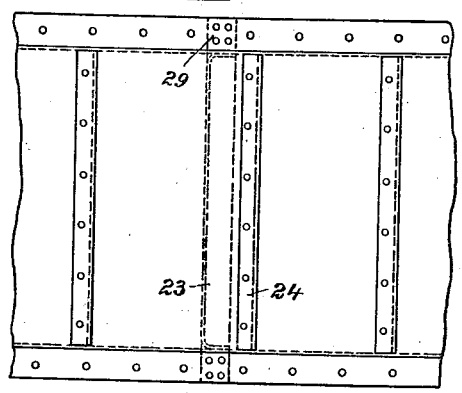
Figure 22:
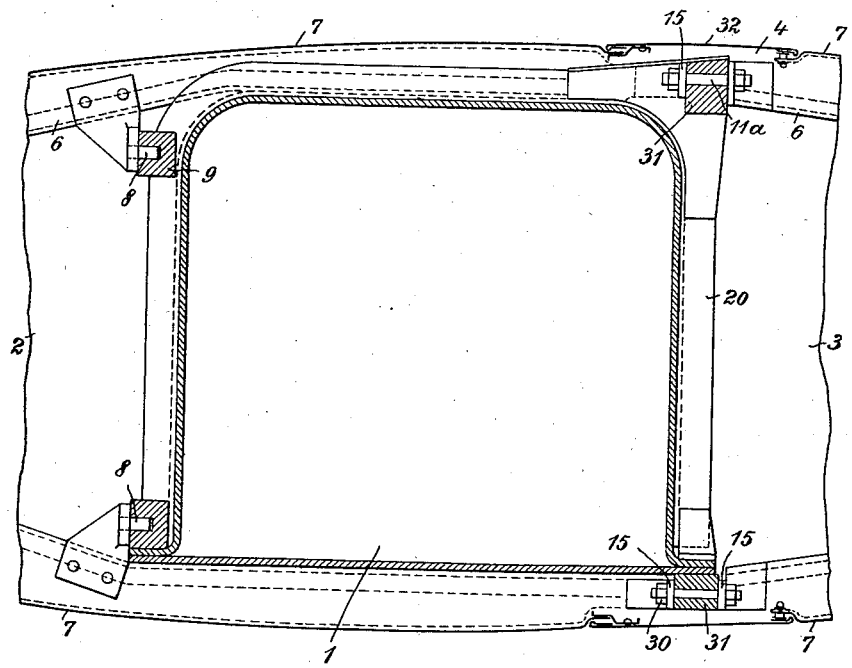
Figure 24:
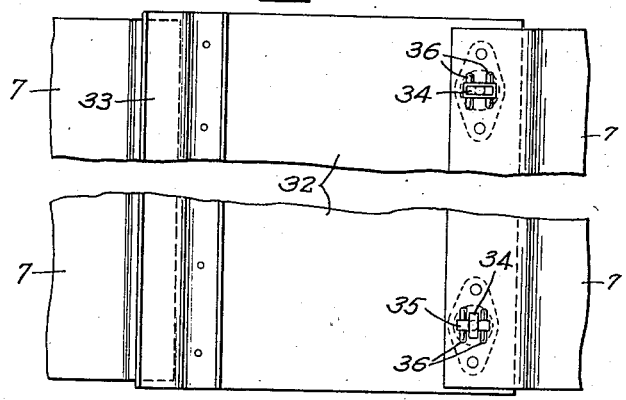

Figs. 20 and 21 show in section and plan respectively an arrangement of transverse walls and stiffening ribs of the spar, Fig. 22 shows a part of a wing in cross-section having a modified form of longitudinal joint between the front and rear wing parts, Figs. 23 and 24 illustrate respectively in section an underneath plan on an enlarged scale, a strip of wing skin covering the joint between the front and rear wing parts, and Fig. 25 illustrates a detail of a rapid fastener for securing the strip of Figs. 23 and 24.

The wing is built-up around a single spar 1 in the form of a hollow closed body constructed to resist bending and twisting forces, which extends from tip to tip of the wing span and can be attached to the fuselage of the aircraft. Front and rear wing parts 2, 3 are secured to the spar 1 completely enclosing it, the parts 2, 3 supplementing each other to form the profile of the wing. They meet at a seam or joint 4 running lengthwise of the wing and preferably located as shown at the rear wall of the spar 1 at the region of least lifting power. The joint can obviously alternatively be displaced towards the front wall of the spar 1. The front and rear wing parts 2, 3 consist each of a large number of suitably profiled ribs 6 covered with a spin 7 and may, if desired, be provided with bracing stays 5. The parts 2, 3 each have a substantial width, preferably the same, the mean width being about 2 metres. These parts may be wider, but this is generally not advantageous as in such a case they become too large to be easily handled by one or two workmen.

The ribs 6 of the front part 2 are connected above and below to the front part of the spar 1 by means of a pin bolt 8 and a close-fitting bushing 9 receiving the bolt. This connection can also transmit, in the direction of flight, pressure forces to the supporting member by means of a connecting flange 10 as shown in Fig. 3 for instance. In some embodiments, for example according to Fig. 3, the bolt 8 is rigidly connected to the rib 6 and the bushing 9 to the supporting member 1. The arrangement can be reversed, as illustrated in Fig. 5.

According to Figs. 2 and 6 to 8, on the free end of the ribs 6 of the front wing part 2, a screw connection is provided which is subjected to the twisting forces and longitudinal pulling forces arising in service. The bolt 11 of the screw connection is tightened by a nut 12, so as to rigidly connect the front wing part 2 to the spar 1. The nut 12 is mounted by means of a flange in a small support bracket 13 of the rear wall of the spar 1 which flange in conjunction with a square nut 14, enables the front part 2 slid on to the spar 1 to be tightened.

After the screw connection 11, 12 has been tightened, the ribs 6 of the rear wing part 3 are secured (Fig. 6) by sliding a lug 15 on the rib 6 on to the nut 12 and securing it there by means of a nut 16 screwed on by means of a key which can be introduced through an opening 17 in the skin 7.

The spar 1, the front and rear wing parts 2, 3 and the connections 9, 10 are manufactured with such accuracy that they fit one into the other exactly, whereby the various members assume, after assembly, their exact predetermined positions. The wing parts 2, 3 lying one beside the other match exactly the wing profile. Thus, disturbances by air-currents are avoided.

Figure 7:
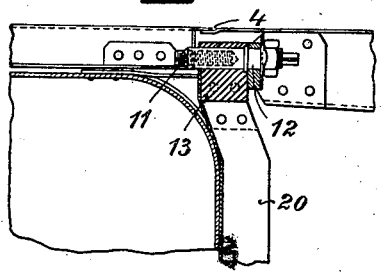
Figure 8:
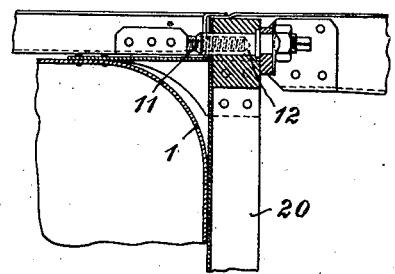
Figure 9:
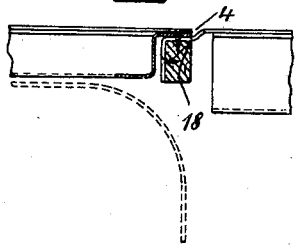

The edges of the skin of the front and rear parts 2, 3 overlap each other along the joint 4 (see, for example, Fig. 6). They are lightly screwed together or attached to one another in any other convenient manner. As shown in Fig. 9, for instance, a ledge 18 of wood may be arranged at the edge of the skin of one member and enables the connection of the edges of the skin by means of wood screws, cement, or the like. Any remaining grooves may be filled so as to obtain a smooth outer surface of the skin which is necessary according to the present knowledge of aerodynamics.

Figure 10:
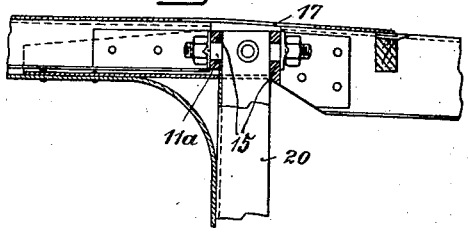

In the modification illustrated in Fig. 10, the ribs 6 of the front and rear wing parts 2, 3 are provided with lugs 15 which are slid on to both ends of bolts 11a attached to a support 20 on the spar 1 and are tightened by nuts.

Figure 11:
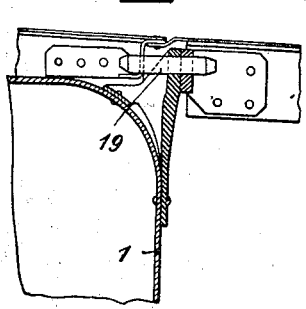

Fig. 11 shows that it is also possible to connect the ribs of the rear wing part 3 by means of bolts 19 which are only liable to be twisted.

The bolt 8, the bushing 9 and the small support 13 can also be attached to stiffening members 20 of the spar 1 which are correspondingly elongated and lie on the outer side. This has the advantage that the connecting parts 8, 9, 13 can easily be riveted on after the construction of the spar has been completed.

Figure 12:
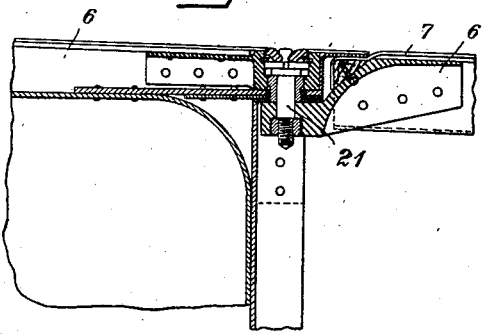

Fig. 12 illustrates a connection at the rear of the spar for the ribs, wherein a shear bolt 21, perpendicular to the skin 7, is employed.

Figure 13:
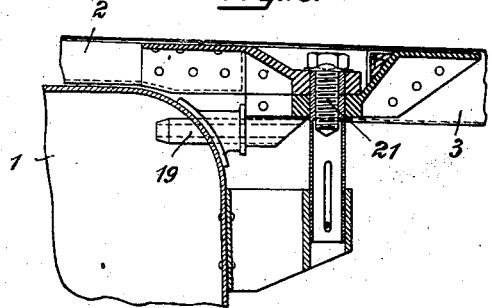

According to Fig. 13, two sets of shear bolts can be provided in the rib connection. The set of bolts 19 (in the form of pins) belonging to the ribs of the rear part 3 and engaging the spar 1 has a horizontal position and the other set of bolts 21 (in the form of screw bolts) provided between the ribs of the front and rear parts 2, 3 has a vertical position.

It will be seen from the foregoing that the front and rear wing parts 2, 3 are easily and rapidly mounted on the spar 1 and can just as easily and rapidly be detached therefrom for overhaul, repair, etc. The parts 2, 3 are advantageously in sections arranged side by side longitudinally of the wing so that the parts extend over only a certain number of ribs without joints. The size of the sections is chosen so that they will be easy to manufacture and handle. The small joints between them, transversely of the wing, may be covered by glued strips of tape or otherwise treated to give a smooth outer surface.

As can be seen from Fig. 2, on the front and the rear walls of the spar 1 free spaces running longitudinally can be provided in which control members, conduit or cable connections and the like, which are attached to the spar or its stiffening members 20 may be accommodated.

The attachment of such cables and the like to the spar can easily be made before the front and rear wing parts 2, 3 of the wing are attached, the side walls of a spar in the form of a box being more advantageous than a tubular spar for such accommodations.

Figure 14:
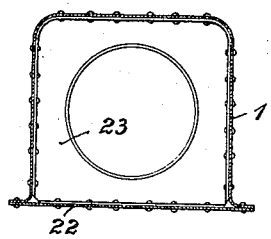
Figs. 14 to 19 illustrate in section various forms of construction of the spar.
Figure 15:
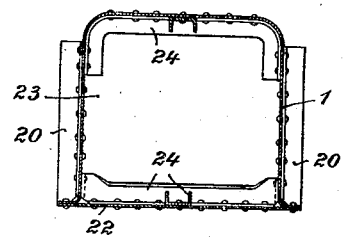

The spar 1 shown in Figs. 2, 14 and 15 is of box-section. It consists of a U-shaped or channel member which is rounded at its upper edges to increase its resistance against bending, and a plane lower closure wall or plate 22 which is connected to flanges extending outward from the U-shaped member by riveting, screwing, welding or the like. Transverse webs 23, which may be provided with holes as shown in order to make them lighter, are riveted at intervals to the inside of the spar by means of flanges provided at their periphery. Stiffening ribs 24 are provided between the transverse webs 23 and are rigidly secured to the spar; they may be provided in the longitudinal and/or transverse direction. The ribs 24 and the stiffening members 20 mentioned previously may have any suitable cross-section, for example, a Z, C or wave shape. The points where stiffening members cross the transverse webs or other stiffening members are bridged in any suitable manner. The strengthening or stiffening means are conveniently assembled and secured while the spar is still open. The closure plate 22 is attached at the last and this can easily be effected since the points where the plate 22 is secured to the U-structure lie on the outside and are freely accessible.

The members 20 and ribs 24 may be dispensed with if the walls of the spar are otherwise sufficiently strong to resist indentation. The stiffening means to be attached to the upper and lower walls of the spar are preferably provided in the interior of the spar in order to be able to make the height of the spar as nearly equal as possible to the thickness of the wing.

Figure 16:
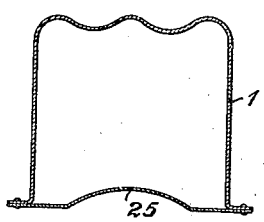

The resistance of the box-shaped spar 1 to bending forces may be increased as illustrated in Fig. 16 by providing longitudinal cavities or waves on the upper wall of the box. Such strengthening means may also be provided on the lower wall of the box.

If desired, the closure plate of the spar 1 may be arranged at its top and may have, for example, the shape of a bowl 25 (Fig. 16), the thickness of which is adapted to the forces to be transmitted and the curvature of which increases the resistance of the wall to indentation and thus the resistance of the spar to bending.

Figure 17:
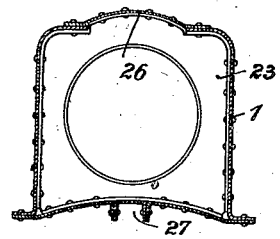

As shown in Fig. 17, a separate member 26 can be riveted into the upper wall of the spar 1, the strength and shape of such member being especially adapted to withstand high compression forces.

Figure 18:
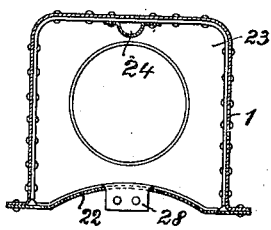

Fig. 18 shows a way in which the upper wall of the box can be stiffened by longitudinal U-shaped ribs 24.

Figure 19:
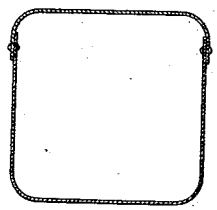

As indicated in Fig. 19, lap joints may be provided at a suitable place if the cross-sections of the spar are sufficiently great and accessible from the inside for uniting the members from which the box form of spar is built-up.

Instead of giving the spar equal dimensions along its entire length, it can be adapted in any suitable way to the smaller forces arising in service at the end of the wing and can thus be made tapered.

According to Fig. 14, the transverse web 23 is riveted to the closure 22 along the entire length of the edge, which can be effected from the open side of the casing if the closure is sufficiently flexible. According to Fig. 17, the transverse web 23 is riveted along the greatest part of the edges to two parts of the closure which consists of three parts, the third part 27 being inserted after conclusion of the riveting process and rigidly secured only to the adjacent parts of the closure. Fig. 18 shows a plate or lug 28 projecting from the lower edge of the transverse web 23 and rigidly secured to the closure 22 indented towards its inner side.

According to Figs. 20 and 21, side plates or lugs 29 of the transverse web 23 engage between the connecting parts of the spar and the closure plate 22, the inner side of which is provided with a rib 24 riveted thereto which serves to replace the lower edge of the transverse web which is not rigidly secured to the closure plate.

If the calculated torsion forces to which the spar will be subjected when in service are great in comparison with the bending forces, the spar is preferably made of cross-section which differs only slightly from a hollow square having walls of equal thickness all around, i. e. it differs only insofar as may be necessitated by the incorporation of means for increasing the local rigidity of the walls of the spar against indentation. However, the more the torsional resistance of the spar can be neglected in comparison with its bending resistance, the more is the basic shape of the most favourable cross-section of the spar not a hollow square but an erect hollow oblong.

Other shapes of the spar than a quadrangular box form can be used if the advantages of this form are wholly or partly dispensed with; for example, the spar may have a triangular or tubular (i. e. circular or the like) cross-section.

The spar, wing skin, ribs, and the connected parts may be made of any suitable material although it is preferred to build-up the spar of sheet metal elements as illustrated. The spar can be built-up of an extremely small number of simple and strong parts and is therefore very cheap to manufacture. Besides this, considerable savings are also made in the preliminary work preceding the manufacture proper, i. e. in calculating, constructing, making drawings, devices and tools.

In a modification, the attachment and detachment of the front and rear wing parts is simplified by providing better access to the connection between them and the spar. This can be achieved by combining the joints with the cut-out portions of the skin provided for passing through the tools, in such a manner that the joint is formed as a slit leaving free the connection points and being covered by an easily releasably fastened strip of skin.

An example of such an arrangement is illustrated in Fig. 22. The lugs 15 of the ribs 6 of the front and rear parts 2, 3 are slid, similarly as in Fig. 10, on to shear bolts 11a and are there fastened by nuts 30. The bolts 11a are located in suitable blocks or other members 31 on the rear wall of the spar so that they are not displaceable axially. The joint 4 between the skins 7 of the front and rear wing parts 2, 3 forms near the connecting points 31 slits of such a width that the connecting points 31 are easily accessible from the outside and that the nuts 30 can easily be adjusted. The slit is covered by a strip 32 of skin which is fastened in an easily releasable manner and which is of the same length as the parts 2, 3. In Fig. 24 for the sake of clearness the lengths are illustrated as being unequal. An easily releasable fastening may be obtained for example by making the front edge of strip 32 of the skin slideable towards the interior of the wing along the cranked edge 7a of the skin 7 of the front part 2 of the wing by means of a riveted edge portion 33, and providing a quick-release fastener for the rear edge of the strip of skin for connection to the end part 3.

Such a quick-release fastener may consist of a screw 34 rotatably by means of a screw driver, which screw is resiliently and axially movable, mounted on the strip of skin and can pass in one position through a cut-out 35 provided in the skin 7 of the rear part 3 of the wing while, after rotation through 90° and moving backwards in an axial direction, it enters between the projection 36 of the skin and is thereby secured against rotation. The edge 7b of the skin of the end parts 3 is also cranked inwardly corresponding to the depth of the fastener. This form of fastener is known per se and is referred to as an example only. It can be replaced by other constructions and easily releasable construction and fastening of the strip of skin can be modified in any other suitable way. The insertible strip 32 of skin does not influence the aerodynamic qualities of the upper and lower faces of the wing detrimentally, since it is easy to form the skins 7 and 32 at the places where they touch each other, so that any disturbance of the airstream is avoided.

We claim:

1. In an aircraft wing structure the combination with at least one wing section forming a longitudinally extending wing part, each such section having a side opening transversely and each section comprising a covering skin on ribs extending transversely to the longitudinal axis of the wing, of fastening means comprising members on the ends of at least some of the ribs at said open side of said wing part and inner fastening members on at least some of the ribs positioned inward from the ends thereof, a separate hollow supporting spar extending longitudinally of the wing and fitting transversely within the side of said wing part and fastening members detachably engaging the said inner and outer members of said fastening means on said wing part so that said spar is contained within said wing part and detachably secured to each section thereof at a plurality of transversely and longitudinally spaced points, and a cooperating wing portion completing the wing contour and comprising at least one separate wing section detachably supported by the spar in position closing over the open side of the first wing part and completing the transverse enclosure of said spar within said wing structure.

2. An aircraft wing structure as set forth in claim 1 in which the cooperating inner fastening members on the ribs and spar are formed to interfit slidingly in a direction corresponding generally to the line of flight and take up stresses in a direction generally normal thereto.

3. An aircraft wing structure as set forth in claim 1 in which the cooperating inner fastening members on the ribs and spar are formed to interfit slidingly in a direction corresponding generally to the line of flight and take up stresses in a direction generally normal thereto while the cooperating outer fastening members at the ends of the wing section ribs are secured together to take up stresses in all directions.

4. An aircraft wing structure as set forth in claim 1 in which the outer fastening members at the ends of the wing section ribs are accessible from outside of the wing and are entirely housed within the wing structure.

5. An aircraft wing structure as set forth in claim 1 in which the cooperating wing portion is at the rear and connected to the fastening means for the forward enclosing wing part and spar so as to transmit the backward pull of the rear wing portion to the forward wing part and to the fastening means at the forward edge of the supporting spar.

6. An aircraft wing structure as set forth in claim 1 in which the longitudinal joint between the wing sections has the shape of a slit providing free access to the fastening means at the ends of the ribs and said slit is covered by a strip secured along its front edge to the covering skin by being inset therein and fastened at its rear edge by quick release fasteners.

7. An aircraft wing structure as set forth in claim 1 wherein the attached ribs are fastened only to the upper and lower portions of the spar and have reinforcing webs spaced from the spar and providing passages running along the spar and adapted to accommodate in said passages members such as control rods, pipe lines, cables and the like.

8. An aircraft wing structure as set forth in claim 1 in which the free edges of the cover skin of the wing sections extending transverse to the direction of flight are reinforced by internal strips and are engaged by detachable means forming a flush wing surface at the outside.

9. An aircraft wing structure as set forth in claim 1 in which the wing sections enclosing the spar are the forward sections and the cooperating wing portion is the rear part of the wing, these portions meeting along lines at the rear of the spar and being fastened thereto.

10. In an aircraft wing structure the combination with a plurality of wing sections forming a longitudinally extending wing part, each such section having a side opening transversely and each section comprising a covering skin on ribs extending transversely to the longitudinal axis of the wing, of fastening means comprising members on the ends of at least some of the ribs at said open side of said wing part and inner fastening members on at least some of the ribs positioned inward from the ends thereof, a separate hollow supporting spar extending longitudinally of the wing and fitting transversely within the side of said wing part and fastening members detachably engaging the said inner and outer members of said fastening means on said wing part so that said spar is contained within said wing part and detachably secured to each section thereof at a plurality of transversely and longitudinally spaced points, and a cooperating wing portion completing the wing contour and comprising a series of separate wing sections detachably supported by the spar in position closing over the open side of the first wing part and completing the transverse enclosure of said spar within said wing structure.

ADOLF KARL ROHRBACH.
ALFRED DORN.